United States Patent [15] 3,688,405
Dutra, Jr. [45] Sept. 5, 1972

[54] PRUNING SHEARS

[72] Inventor: Joseph G. Dutra, Jr., 4568 Thornton Ave., Fremont, Calif. 94536

[22] Filed: April 21, 1971

[21] Appl. No.: 136,096

Related U.S. Application Data

[63] Continuation-in-part of Ser. No. 843,073, July 18, 1968, abandoned.

[52] U.S. Cl.................................................30/135
[51] Int. Cl...........B25f 3/00, B26b 1/00, B26b 3/00
[58] Field of Search.........................30/124, 134, 135

[56] References Cited

UNITED STATES PATENTS

| | | | |
|---|---|---|---|
| 887,494 | 5/1908 | Molertz | 30/135 |
| 3,336,667 | 8/1967 | Wallace et al. | 30/124 X |
| 2,775,032 | 12/1956 | Sorensen | 30/134 |

FOREIGN PATENTS OR APPLICATIONS

| | | | |
|---|---|---|---|
| 164,730 | 9/1958 | Sweden | 30/124 |
| 838,960 | 3/1939 | France | 30/124 |

Primary Examiner—James L. Jones, Jr.
Attorney—Warren, Rubin, Brucker & Chickering

[57] ABSTRACT

A pruning shears is disclosed which is formed with a holder for gripping prunings after cutting of the same. The pruning holder is mounted for reciprocal displacement on a plane parallel to the cutting blade and is spring biased toward the opposite jaw of the pruning shears. Manual adjustment means is provided for selective continuous adjustment of the spring biasing force applied to the pruning holder to enable holder to grip light and delicate plants, such as flowers, without damaging the same as well as heavy branches. The pruning shears are additionally preferably provided with manually adjustable spring biasing of the return of the jaws to opened position, and they are also preferably provided with a housing extending around and enclosing the back side of the jaw in which the pruning holder is carried to prevent entry of prunings into the holder biasing mechanism.

9 Claims, 11 Drawing Figures

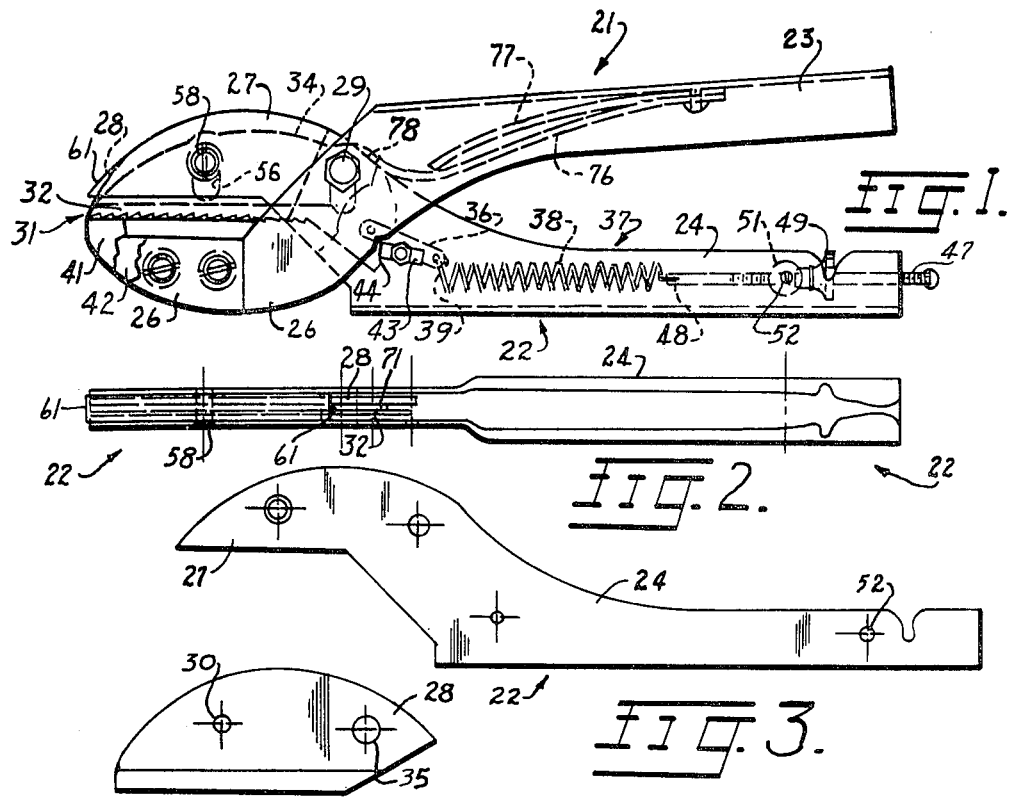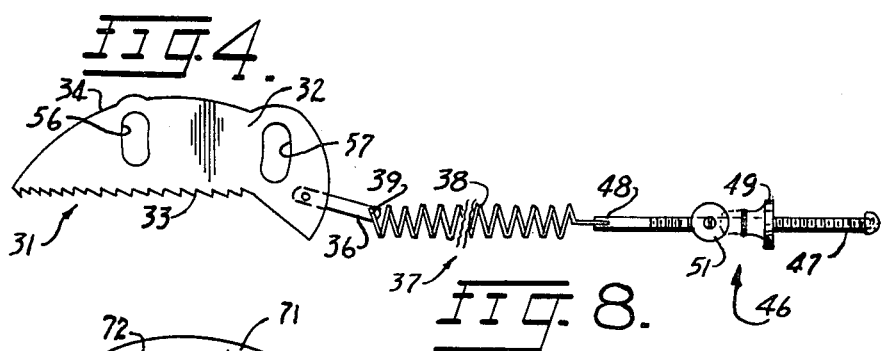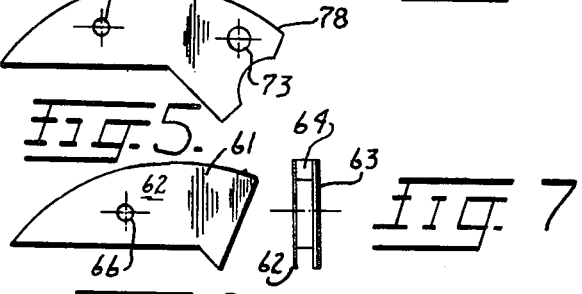

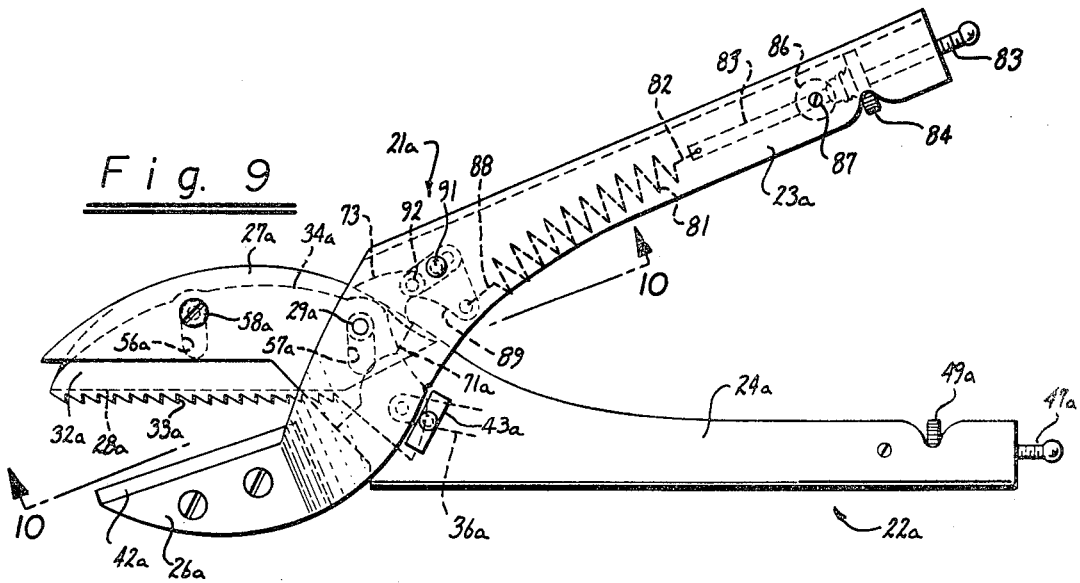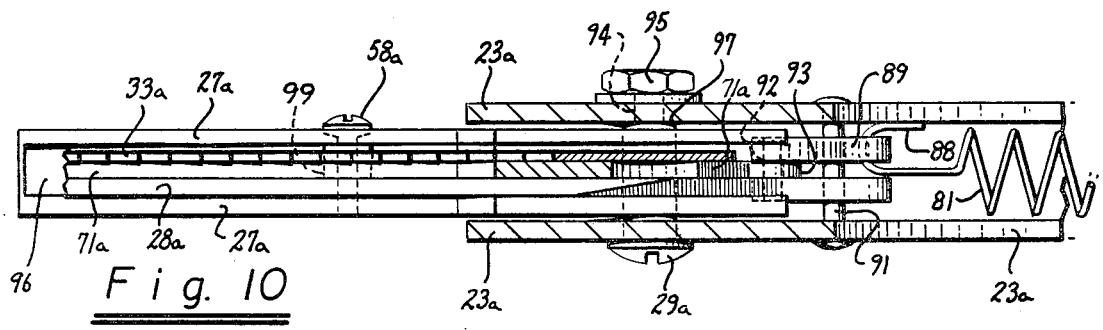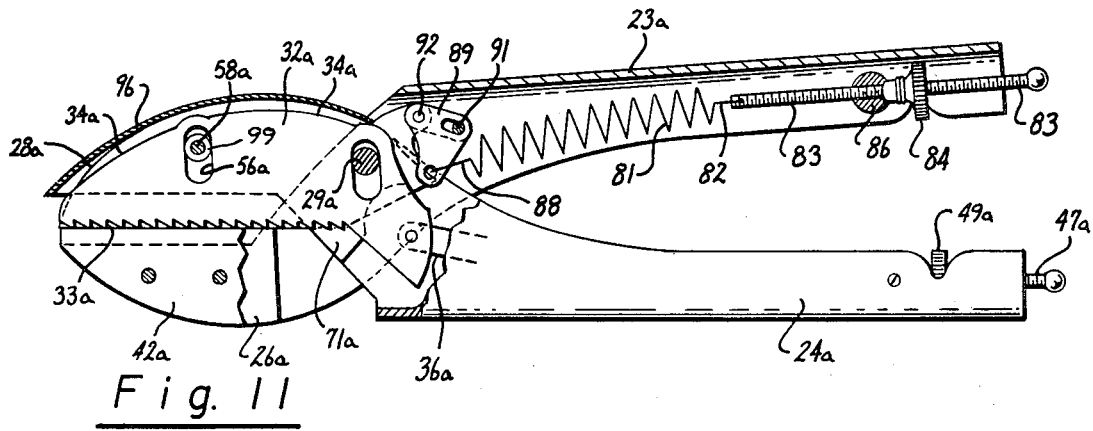

PRUNING SHEARS

BACKGROUND OF THE INVENTION

The present application is a continuation-in-part application based upon earlier filed application Ser. No. 843,073, filed July 18, 1969 now abandoned.

In pruning various plants and shrubs it is often highly desirable to be able to have a pair of pruning shears which will not only cut the plant, but grip or hold the portion of the plant which has been pruned. This is particularly desirable and necessary when the user of the shears does not have a free hand to grasp the pruning as it is cut, which is often the case. A number of different types of pruning shears have been developed which include as a part thereof a holder or gripping element which is formed to hold the pruning after it is cut and until the user can free the hand not using the shears to grasp the pruning. Typical of these prior pruning shears are the shears disclosed in the U.S. Pat. Nos. 887,494 and 2,775,032 and in French Pat. No. 838,960. While these shears with holding devices are effective to various degrees, they do not provide certain advantages which have been found to be highly desirable in connection with the pruning of various types of plants.

In some situations a pair of pruning shears may be used only for one type of pruning job. In most instances, however, pruning shears are employed for a variety of tasks. Therefore, the user may be trimming delicate flowers having fragile stems, such as daffodils, and thereafter be pruning branches off of a small tree or shrub. Similarly, less gripping force is required when pruning large diameter branches than when trimming small branches. Prior pruning shears which have been formed with pruning holders have not been constructed in a manner which allow the holding or pruning gripping force to be varied to accommodate the different types of plants which are to be held by the holding apparatus on the shears. The prior holding structures are spring biased at a fixed spring biasing force in order to provide a gripping force; however, if the spring force is relatively low, the shears will not hold heavy prunings. Conversely, if the spring force on the pruning holder is high enough to grip and hold heavy prunings, this force will crush delicate flowers. Additionally, prior shears with pruning holding mechanisms also have the problem of entry of prunings or other plants into the operating mechanism of the holder. Pruning shears are commonly employed in brushy areas where twigs, leaves, etc., may slip between the movable portions of the holder, causing the same to become jammed and inoperable. Still further, most pruning shears are spring biased, so that the jaws are urged to an opened position to enable use with one hand by a simple squeezing of the handles. It is further highly advantageous to be able to vary the spring biasing force applied to the jaws of the pruning shears, again depending upon the weight or delicacy of the plant being pruned and the strength of the user.

Accordingly, it is an object of the present invention to provide a pruning shear having a pruning holding mechanism which is constructed so that it may be used with delicate and relatively fragile plants and flowers as well as heavy, woody brush and shrubs.

It is another object of the present invention to provide pruning shears having a pruning holding mechanism which is trouble free in its operation and not susceptible to jamming when in use in environments in which the plants being pruned are tangled and bushy.

Still another object of the present invention is to provide pruning shears having a pruning holder mechanism which provides a more uniform holding force on the pruning cut from the plant by the shears.

Another object of the present invention is to provide pruning shears with a holder mechanism which are durable, easy to manufacture and easy to operate.

The pruning shears of the present invention have other objects and features of advantage which will become apparent in the description hereinafter.

SUMMARY OF THE INVENTION

Briefly the holding mechanism in the pruning shears of the present invention is comprised of a manually engageable adjustment means mounted to the pruning shears and operatively connected to spring biasing means. The spring biasing means 31 formed and connected to bias the pruning holder toward a pruning support for gripping of prunings cut by the shears. The manual adjustment is formed for selective adjustment of the spring biasing force applied to the pruning holder so that the user can selectively prune delicate flowers without damaging them and also adjust the holding force to hold heavy woody branches. The pruning holder is formed for reciprocal displacement relative to the cutting blade of the shears in a parallel manner over the length of the pruning engaging edge for a more uniform gripping force of the pruning. Additionally, the shears are preferably provided with a housing element extending around and shielding the holding mechanism so as to prevent entry of portions of plants and prunings into the mechanism. Finally, manually adjustable spring biasing means for biasing the jaws of the shears open for operation of the shears by one hand similarly affords the user the ability to selectively determine the force with which the jaws spring to opened position based upon the type of pruning which is being undertaken and the user's strength.

BRIEF DESCRIPTION OF THE DRAWINGS

FIG. 1 is a side elevational view of a pair of pruning shears constructed in accordance with the present invention.

FIG. 2 is a top view of the blade carrying handle of the shear of FIG. 1 with the spring biasing mechanism removed.

FIG. 3 is a side elevational view of the handle of FIG. 2.

FIG. 4 is a side elevational view of a blade constructed for use with the shears of FIG. 1.

FIG. 5 is a side elevational view of a spacer element formed for positioning between the cutting blade and the holder in the shears of FIG. 1.

FIG. 6 is a side elevational view of a housing element formed for use in the shear of FIG. 1.

FIG. 7 is an end view of the housing of FIG. 6.

FIG. 8 is a side elevational view of the holder and spring biasing mechanism of the shear of FIG. 1.

FIG. 9 is a side elevational view of an alternative embodiment of the pruning shears of the present invention.

FIG. 10 is an enlarged fragmentary cross-sectional view taken along the plane of line 10—10 in FIG. 9.

FIG. 11 is a side elevational view, partially broken out, of the shear of FIG. 9.

DESCRIPTION OF THE PREFERRED EMBODIMENTS

Referring to FIG. 1, the pruning shears of the present invention can be seen to include a pair of members, generally designated 21 and 22, each being formed with manually engageable handles 23 and 24 at first ends thereof and jaws 26 and 27 at opposite ends thereof. Jaw 27 is formed to include a cutting blade 28, which may best be seen in FIG. 4, and blade 28 is mounted in jaw 27 through openings 30 and 35 by pins 29 and 58 in a manner analogous to the mounting of the blade in pruning shears of FIGS. 9, 10, 11, which will be set forth in greater detail hereinafter. Pivotal means 29, here formed as a bolt passing through members 21 and 22 intermediately of the jaw and handle ends thereof, joins the members for relative articulation as is common in the case of a squeeze-type pruning shear. Also mounted to jaw 27 is a pruning holder means, generally designated 31, and holder means 31 includes a blade-like holder element 32 having a serrated pruning engaging edge 33, a back peripheral edge 34 and connecting link 36 to spring biasing means, generally designated 37. The holder and spring biasing means can be best seen by reference to FIGS. 1 and 8. Mounted to jaw 26, which is a part of member 21, is an anvil 41 and pruning support element 42 positioned to cooperate, respectively, with blade 28 and holder 31 to cut the plant being pruned and hold the cut portion. Support element 42 is preferably formed of a resilient material, such as natural or synthetic rubber, and protrudes above jaw portion 26 of member 21 to prevent damage to the pruning.

As thus far described, the elements of the pruning shears of the present invention may be found in prior pruning shear constructions. In order to provide a pruning shear with greater versatility in cutting delicate and heavy plants, the pruning shears of the present invention are formed with manually engageable adjustment means, generally designated 46, mounted to member 22 and operatively connected to spring biasing means 37. Adjustment means 46 is formed for selective adjustment of the spring biasing force applied to pruning holder 31 by spring biasing means 37. The user can, therefore, selectively prune flowers without damaging or crushing the stems by the holder and still can prune heavy branches or even fruit and hold the stem or branch in which the fruit was growing with the resilient force of the spring biasing means. Still further, when trimming large diameter branches, the holding force generated by the holding mechanism can be reduced or, if small branches are trimmed, the gripping force increased. Adjustment means 46 is preferably formed for continuous adjustment to selected fixed predetermined biasing forces over the range of forces applied to the holder 31. This can be advantageously accomplished by forming the spring biasing means 37 as a tension spring 38 mounted in handle 24 with the longitudinal axis thereof aligned with the longitudinal axis of handle 24 and a first end 39 of spring 38 secured to link 36 for transfer of biasing forces to holder blade 32. Adjustment means 46 is preferably comprised of an elongated threaded member 47 secured at end 48 to tension spring 38 from which it extends. A manually engageable member 49 is threadably mounted on elongated member 47 and is formed with a generally spherical surface which engages a matching recess in bearing member 51 mounted to handle 24 by a fastener 52. Member 49 is thus free to rotate relative to bearing member 51 and threaded elongated member 47 is free to pass through bearing member 51. Thus, the tension force in spring 38 can be increased or decreased by rotating manually engageable element 49 and causing elongated member 47 to move axially within handle 24 either toward or away from the pruning holder, depending upon the direction of rotation of the adjustment element 49.

In operation the pruning shears of the present invention afford a very effective tool for pruning a wide variety of plants. If the user is, for example, going to be trimming a flower having a delicate stem which he does not want to crush, he will adjust element 49 by rotating the same and to cause elongated thread 47 to move toward the holder and spring 38 to lose some or all of its tensioning force. The tensioning force remaining in spring 38 will be transferred by link 36 to blade 32. It should be noted that blade 32 is formed with slots or openings 56 and 57 which are elongated and through which pins 29 and 58 pass. Slots 56 and 57 are larger than the shafts of the pin 29 (and a sleeve more fully set forth in connection with FIGS. 9, 10 and 11) and pin 58 so that holder element 32 is free to be displaced or reciprocated upwardly relative to the remainder of the elements in jaw 27. The spring biasing force through link 36 tends to bias the holding blade 32 down by reason of the downward component in limbs 36, as shown in FIG. 1. Slots 56 and 57 provide mounting means for the pruning holder which allow the holder to be displaced upwardly to a position parallel to its original spring biased position. This parallel displacement is important in that it prevents binding of the holder, or alternatively, tearing of the pruning by the serrated teeth.

The user orients the shears so that the holder 32 is on the side facing away from the plant so that the holder will grip the pruned portion of the plant. As cutting blade 28 passes through the stem of the flower, teeth 33 on holder 32 will begin to engage the stem portion of the pruned or severed plant and urge the same against the support element 42 in jaw 26. If tensioning force in spring 38 is set at a high level, the teeth 33 will penetrate deeply into the stem and tend to crush the same. If, as above described, the tensioning force has been selected to be relatively low, holder element 32 will be displaced upwardly by the stem, rather than crushing the stem. The teeth in the holder will penetrate slightly into the pruning and hold the same against the support element 42. Thus, the pruned flower, even though delicate, is held by the holding mechanism of the shears of the present invention without crushing. When the same shears are used for pruning heavy branches or even fruit from trees, element 49 can be rotated in a direction causing threaded element 47 to extend spring 38 and greatly increase the tensioning force in the spring and the downward biasing force to holder element 32. When a high tension force is selected, the entire weight of several oranges or a bunch of grapes, for example, can be held by the holder after pruning of the branch on which the fruit was growing from the plant. This high tensioning force, however, would crush the stem of a flower.

When pruning shears are used to trim diseased portions of a plant or tree from the remainder of the plant, pruning holding mechanisms which have been incorporated in prior pruning shear constructions have been the source of spread of disease. Since the prior pruning holder constructions have been biased with a fixed spring force, the holding force is usually selected to be moderately high for pruning relatively heavy branches. Moreover, this holding force causes a squeezing of the pruning prior to completion of cutting of the pruning from the remainder of the plant. The holder mechanism, therefore, has often been found to squeeze the pruned diseased portion of the plant hard enough so as to cause the saps and fluids which may be carrying the disease to be urged toward the non-diseased portion of the plant. Thus, the pruning holding mechanism of the present invention is particularly advantageously used when pruning diseased plants, since the holder may be set at a very low spring biasing level to avoid crushing the diseased pruning and spreading of the disease to the unaffected portions of the plant.

In order to prevent jamming or interference with the gripping action of the holding mechanism of the shears of the present invention, it is a further feature of the present invention that the holding mechanism be enclosed by a housing 61 secured to jaw 27. Housing 61 is formed to extend from the jaw in which it is supported around pruning holder 31 to enclose substantially the entire back peripheral edge 34 of the pruning holder, and the housing extends down to a position adjacent and above pruning engaging edge 33 of the blade 32. As may be seen by reference to FIGS. 6 and 7, the housing is preferably formed as a U-shaped member having side walls 62 and 63 and connecting end wall 64 so as to span over the cutting blade and holder, which are disposed between walls 62 and 63. Walls 62 and 63 are here shown as mounted inside the sides of member 22 forming jaw 27. Housing 61 is secured to jaw 27 by pin 58 through opening 66. Housing 61 acts as a shield around the back peripheral edge of the holder and blade so that plants and prunings therefrom cannot enter between the cutting blade 28 and holder 31 or in slots 56 and 57 to interfere with the operation of holder 31.

In order to insure proper displacement of the pruning holder mechanism of the present invention and prevent the cutting blade from damaging the holder, it is preferable to provide the pruning shears of the present invention with a spacer element 71 which is mounted between cutting blade 28 and holding blade 32. Spacing element 71 is formed with an opening 72 through which pin 58 passes. Therefore, spacer 71 causes the holder to be positioned at a lateral and generally parallel plane from cutting blade 28 for gripping of the pruning at a spaced distance from the position in which it is cut. This is important since it facilitates gripping of the end of the pruning, and additionally, the spacer element acts as a guide which prevents displacement of the serrated pruning engaging edge 33 of holder 32 laterally and into the path of the cutting blade. In prior pruning shear constructions, the holders have been flexible enough, either in their support or in the material from which they are formed, so as to be displaceable toward the cutting blade after repeated use. Such a displacement will inevitably result in a portion of the holder coming between the blade and anvil and being damaged.

Spacing element 71 is further formed with opening 73 through which pin 29 passes. Mounted in handle 23 is a leaf spring 76 and second spring member 77 which are used to bias the jaws 26 and 27 of the pruning shears of the present invention to an opened position for use of the shears with one hand. Spring 76 bears on the upper shoulder 78 of spacer element 71, best seen in FIGS. 1 and 5. Thus, the spring force applied to spacer element 71 through shoulder 78 causes jaw 27 to be urged upwardly and handle 24 can be urged downwardly, while causing handle 23 to be urged upwardly and corresponding jaw 26 to be urged downwardly.

Referring now to FIGS. 9, 10 and 11, further details of construction of the pruning shears of the present invention and modified form of the spring jaw biasing mechanism of the present invention is illustrated. Since most of the parts in the pruning shears of FIGS. 9, 10 and 11 are the same as those herein above described in detail in connection with the shears illustrated in FIGS. 1 through 8, corresponding elements have been designated with the same reference numerals with the addition of *a* after each reference numeral. As to new parts found only in this embodiment of the present invention and greater detailed description of parts common to both embodiments, new reference numerals have been used.

In order to improve the versatility of the pruning shears of the present invention, it is preferable to further form the shears with jaw spring biasing means which are adjustable to bias the jaws to opened position through a range of biasing forces which may be selected by the user. As shown in FIG. 9, the leaf springs of the shears of FIG. 1 have been replaced by a spring biasing and manual adjustment means similar to that for the holder of the shears of FIG. 1. Therefore, tension spring 81 is connected at end 82 to a threaded elongated member 83 having a manually engageable adjustment member 84 threadably mounted thereon. The adjustment member is formed for rotation with respect to and bearing upon a bearing member 86 which is fastened by fastener 87 to handle 23a. Thus, rotation of manually engageable member 84 will cause threaded member 83 to extend or release spring 81. The end 88 of spring 81 is fastened to linkage element 89 which in turn is pinned for pivotal movement about pin 91 with respect to handle 23a. An opposite end of linkage member 89 is pinned by pin 92 to an ear 93, which is secured to and extends from the spacer element 71a. Thus, the tension force in spring 81 is transmitted to linkage 89, ear 93 and spacer element 71a. This tension force causes pivoting of the linkage about pins 91 and 92 and urges the spacer element upwardly, causing jaw 27 to move away from jaw 26 to a position as shown in FIG. 9.

When the user is cutting a relatively heavy and woody plant or shrub, blade 28a may become stuck in a closed position by reason of frictional engagement with the pruning held by holder 32a. If the spring force generated by spring 81 is selected to be relatively high, blade 28a will spring back away from the heavy pruning and be free for another cut. Since the user must overcome the spring biasing force, it is not always desirable to simply set this force at a fixed relatively high value. Moveover, some women cannot use shears having a high jaw biasing force. Therefore, when the shears are to be used to prune smaller plants and flowers or by a user who is not too strong, the chance of the blade 28 becoming frictionally caught or wedged against a pruning becomes remote, and it quite possible and highly desirable to reduce the tension force in spring 81 so that the user does not need to overcome an unnecessarily high tension force.

As will be seen in FIG. 10, the end 88 of spring 81 is preferably looped and passes through an opening in linkage 89. Linkage 89 is shown as being formed as a bifurcated element pinned to the handle by pin 91 at one end and pinned by pin 92 to ear 93 at an opposite end. As also may be seen in FIG. 10, pin 29a is preferably formed with a shoulder 97 and a stepped smaller diameter end 94 onto which nut 95 is threadably secured. The stepped end insures that the opposite sides of handle portion 23a are maintained in fixed spaced relation and cannot pinch down on member 23a and prevent pivoting thereof. Similarly, pin 58 is preferably provided with a sleeve 99 (FIGS. 10 and 11), which frees holder blade 32a by reason of slot 56a to be displaced and not pinched by screw 58.

As best shown in FIGS. 10 and 11, the shear may be formed with a housing shielding the back peripheral edge 34a of the holder by merely closing the back edge between the jaw portion 27a of member 22a by means of a curved sheet or closure element 96. As shown in FIGS. 6 and 7, housing 61 is formed as a U-shaped member. Closure of the back peripheral edge 34a of the holder, however, can be accomplished simply as shown in FIGS. 9, 10, and 11 by element 96, which is equivalent to element 64 of housing 61. As may be seen in both forms of the shears of the present invention, a locking mechanism including pivotal member 43 and notch 44 may be provided to lock the jaws in closed position against the jaw biasing force for storage of the shears. In FIG. 1 the pivotal member 43 is pivoted into locking position and in FIG. 9 it is free for opening of the jaws.

The shears may be conviently formed of high strength carbon steel in order to provide the desired durability, and the holder is advantageously formed from stainless steel to resist corrosion. Cutting blades are typically formed from heat treated steel in order to maintain a cutting edge.

Additionally, spring biasing can be adjusted through discrete predetermined levels by means of a lever-acting adjustment instead of the continuous threaded elements illustrated in the drawing. Thus, a high-medium-low tension adjustment can conviently be used with the shears of the present invention.

I claim:

1. Pruning shears including a pair of members each being formed with manually engageable handles at first ends thereof and jaws at opposite ends thereof with at least one of said jaws being formed to include a cutting blade, pivotal means joining said members intermediately of said ends for relative articulation, and pruning holder means mounted to a first jaw for movement therewith and further mounted for reciprocal displacement relative to said first jaw, the remaining of said jaws being formed with a pruning support element positioned to cooperate with said pruning holder means to grip a pruning upon cutting of the same, and spring biasing means mounted to said members and formed to bias said pruning holder means toward said pruning support element, the improvement comprising:

manually engageable adjustment means mounted to one of said members and operatively connected to said spring biasing means, said adjustment means being formed for adjustment to selected fixed values of a spring biasing force applied to said pruning holder means by said spring biasing means whereby the user can selectively prune delicate as well as sturdy plants without damage thereto from said pruning holder means.

2. Pruning shears, as defined in claim 1 wherein said pruning holder means includes a blade-like element having a serrated pruning engaging edge to provide a pruning holder and wherein said pruning holder is mounted adjacent said jaw including said cutting blade for reciprocation of said pruning holder in a plane parallel to said cutting blade, the further improvement wherein:

said spring biasing means is connected to said pruning holder for the application of biasing forces thereto, and said adjustment means is mounted in the handle of one of said members and is formed to be continuously adjustable and selectively fixed in any predetermined adjustment over the range of spring biasing forces applied to said pruning holder.

3. Pruning shears as defined in claim 2 wherein, said spring biasing means is formed as a tension spring mounted in a handle of one of said members with the longitudinal axis thereof aligned with the longitudinal handle of said member; and said adjustment means is comprised of an elongated threaded member secured at one end to said tension spring and extending away therefrom, a manually engageable member threadably mounted on said elongated threaded member, and a bearing member mounted to said handle, said manually engageable member bearing against said bearing member and formed for rotation with respect to said bearing member to allow adjustment of the tension in said tension spring by rotation of said manually engageable member.

4. Pruning shears as defined in claim 2, and pruning holder mounting means mounting said pruning holder to said jaw for reciprocal displacement relative thereto, said pruning holder mounting means further being formed to allow upward displacement of said serrated pruning engaging edge from a lowermost spring biased position to an uppermost position substantially parallel to said lower most position over the length of said serrated pruning engaging edge.

5. Pruning shears as defined in claim 1, and jaw spring biasing means mounted to said members and formed to apply a spring biasing force to said jaws to bias said jaws to an open position, said jaw biasing means including manually engageable adjustment means mounted to one of said members and formed for continuous selective adjustment of said spring biasing force applied to said jaws by said jaw spring biasing means.

6. Pruning shears as defined in claim 1, and
a housing element secured to said first jaw and formed for reciprocal displacement of said pruning holder means therein, said housing element being further formed to extend from said jaw around substantially the entire back peripheral edge of said holder and to extend down to a position adjacent and above a pruning engaging edge of said pruning holder means whereby plants and prunings therefrom are shielded by said housing element from entry between said jaw and said pruning holder means along said back peripheral edge.

7. Pruning shears including, a pair of members each being formed with manually engageable handles at first ends thereof and jaws at opposite ends thereof with a first jaw being formed to include a cutting blade and an opposite second jaw being formed to include a cutting anvil, pivotal means joining said members intermediately of said ends for relative articulation, pruning holder means including a blade-like pruning holder having a pruning engaging edge and a back peripheral edge mounted to said first jaw for movement therewith and further mounted for parallel side-by-side reciprocation of said pruning engaging edge relative to said cutting blade, said second jaw being formed with a pruning support element positioned to cooperate with said pruning holder means to grip a pruning upon cutting of the same, and spring biasing means formed to bias said pruning holder toward said pruning support element, the improvement comprising:
  a housing element secured to said first jaw and formed to extend from said first jaw around said pruning holder to enclose substantially the entire back peripheral edge of said pruning holder and said cutting blade, said housing and said jaw being further formed to extend down to a position adjacent and above said pruning engaging edge whereby plants and prunings therefrom are shielded by said housing element from entry between said cutting blade and said pruning holder along said back peripheral edge of said pruning holder.

8. Pruning sears as defined in claim 7, and
a spacer element mounted to said first jaw and positioned between said cutting blade and said pruning holder, said spacer element being formed to guide the reciprocal displacement of said pruning holder in a plane parallel to the plane of travel of said cutting blade, said housing being formed to enclose the back peripheral edge of said spacer element in addition to said cutting blade and said pruning holder.

9. Pruning shears as defined in claim 7, and
a. manually engageable adjustment means mounted to one of said members and operatively connected to said spring biasing means, said adjustment means being formed for selective adjustment of the spring biasing force applied to said pruning holder means by said spring biasing means;
b. jaw spring biasing means mounted to said members, operatively connected to said jaws and formed to bias said jaws to an open position; and
c. manually engageable jaw biasing adjustment means mounted to one of said members and operatively connected to said jaw spring biasing means, said adjustment means being formed for selective adjustment of the spring biasing force applied to said jaws by said jaw spring biasing means.

* * * * *